Patented June 27, 1933

1,915,662

UNITED STATES PATENT OFFICE

CHARLES B. GNADINGER, OF MINNEAPOLIS, MINNESOTA

INSECTICIDE

No Drawing.    Application filed July 3, 1929. Serial No. 375,884.

This invention relates to the production of insecticides, to the method of making the same, and to insecticides of varying concentrations produced by combining with a chemical substance belonging to a certain organic series.

The invention also relates to the production of an insecticide base, as well as to the production of insecticides of which said base is an ingredient. The invention is partly based on the discovery of a solvent for pyrethrum flowers capable of extracting the maximum amount of the active insecticidal material of the flowers.

There are at present a number of insecticides for household use for killing flies, roaches, etc., which are made by extracting pyrethrum flowers with kerosene or other light mineral oil and using about one pound of flowers to one gallon of oil.

Many firms who sell insecticides purchase their insecticide bases or concentrates from manufacturing chemists and then sell the diluted product. Therefore, there is a considerable demand for concentrated extracts of active insecticidal principles, particularly of pyrethrum flowers, in which the extracts are preferably soluble in mineral oil. The advantages of such concentrated extracts are that they are easily handled and stored and are less costly to ship. The saving of freight is of particular importance when shipping is to distant points, for example to foreign countries.

At present there are on the market a number of so-called concentrated insecticidal extracts in which the degree of claimed concentration is from two to eight pounds of flowers per gallon; about the best concentration obtainable by the ordinary methods using known solvents and methods. By practicing the invention herein, an extract can be produced having a maximum concentration and containing the active principle of from twenty to forty pounds of pyrethrum flowers to the gallon.

In searching for a substance having a maximum solvent ability for insecticidal principles of plants, as for example pyrethrum flowers, it has been found that a substance known as ethylene di-chloride, or symmetrical di-chlor-ethane, or 1-2 di-chlor-ethane, which has the following formulas: $(CH_2Cl)_2$ and $CH_2Cl\text{-}CH_2Cl$, (respectively general and structural), possesses certain desirable physical as well as chemical characteristics, for the purpose herein. The present invention is therefore based on the discovery and use of ethylene di-chloride as a solvent for the insecticidal principles of plants, for example, pyrethrum, to obtain an oleo resin, from which a concentrated extract can be prepared by extraction with a mineral oil, such as kerosene.

To the best of my knowledge the high concentrations obtainable by the practice of the invention herein are not obtainable, except by substances which are more explosive or more poisonous or more expensive than the substance claimed herein. A novel feature of my invention is therefore the discovery and use of ethylene di-chloride. Inasmuch as it is most desirable to obtain an extract having as high a concentration of the active principle of the flowers as possible, to each gallon, the invention herein is valuable for the reason that such concentrations can be unfailingly obtained substantially without risk, and cheaply.

For the sake of completeness, and to accentuate the advantages flowing from the practice of the present invention, it must be known that oleo resins of pyhethrum have been made by using alcohols, acetone, benzene, chloroform, carbon tetra chloride and petroleum ether, but the use of each of these substances has certain disadvantages: For example, the oleo resins obtained by the use of acetone or alcohols are resinous to such an extent that only from sixty to seventy per cent of the active principle can be extracted from the oleo resin with kerosene, unless such an excess of kerosene is used as to make the proportion of flowers per gallon extremely small. Moreover, the oleo resins made with alcohols or acetone yield an extract having a dark green color which is objectionable. The chief disadvantage in producing substances of the class herein treated is the difficulty of extracting the active principle from the oleo resin with kerosene. In the process of producing all products of the general nature treated of herein, the oleo resin is first produced. Then the oleo resin is treated with kerosene to extract the active principle. When alcohols are used, there is a certain amount of water present which cannot be removed except by distillation at such temperatures as will injure the active material. Consequently the kerosene does not mix with this material because of its water content and therefore, there is a considerable loss of active material which is not extracted. The use of benzene is dangerous because of its explosibility and because it is extremely poisonous to those handling it. The use of chloroform is objectionable because upon distillation in the presence of moisture hydro-chloric acid is formed which attacks the metal vessels used, and substantially reduces the efficiency of the active principle of the flowers. The same objections apply to carbon tetra-chloride.

Ethylene di-chloride is the only one of these chlorine derivatives which does not form hydro-chloric acid on distillation in the presence of moisture. Experiments have shown that 98.2 per cent of the active material in the flowers can be obtained in kerosene solution, from an ethylene di-chloride oleo resin. Ethylene di-chloride, moreover, is not dangerous to the health of the operator when properly handled, and has less fire and explosion hazard than petroleum ether.

The novel feature of this invention is the use of ethylene di-chloride as a solvent for pyrethrum or equivalent insecticidal substances of plants, to produce an oleo resin from which a concentrated extract can be prepared by extraction with kerosene.

While the proportions of ingredients disclosed herein are not of the essence of the discovery, I will describe one of the quantitative embodiments of the process which thus far has been found to yield the best results, which description will suffice to disclose to those skilled in the art a practical working basis for producing the improved product claimed herein.

My product can be made in large quantities in the following manner: Three thousand pounds of ground pyrethrum flowers are percolated or extracted with sufficient ethylene di-chloride to remove substantially all of the active material. For extracting the above amount of pyrethrum flowers, about two thousand gallons of ethylene di-chloride are used. After extracting, the ethylene di-chloride solution is distilled off, either under atmospheric pressure, or in vacuo, to obtain an oleo resin. With the amounts mentioned, the yield is approximately two hundred twenty-five pounds of oleo resin. This oleo resin is then treated with seventy-five to one hundred fifty gallons of kerosene or other mineral oil in a suitable mixer, resulting in a concentrated solution of the active principle which contains the toxic material from twenty to forty pounds of flowers in each gallon. This highly concentrated solution is then filtered and is thereafter ready for shipment. The buyer or manufacturer dilutes the solution of active material with nineteen to thirty-nine parts of kerosene or other mineral oil, to obtain a household insecticide having in each gallon the active principle from one pound of pyrethrum.

It is conceivable that the quantities and methods of use of ethylene di-chloride may be varied by those skilled in the art, in light of the discoveries herein, and there is therefore no intention to be limited entirely by the methods or specific quantitative examples set forth herein, although these are claimed along with the product.

I claim as my invention:

1. A method for preparing a concentrated insecticidal solution which consists in extracting pyrethrum flowers with ethylene di-chloride, distilling the extract to obtain an oleo resin, and treating the oleo resin with a mineral oil.

2. A method for preparing a concentrated insecticidal solution, which consists in extracting ground pyrethrum flowers with ethylene di-chloride, distilling the extract to obtain an oleo resin, and dissolving the oleo resin in a mineral oil in a manner to obtain a solution having a toxic principle content within the range of twenty to forty pounds of flowers to each gallon.

3. A method for preparing a product of the class described which consists in manipulating the following substances in proportions substantially corresponding to the following specific quantities: extracting three thousand pounds of pyrethrum flowers with sufficient ethylene di-chloride to remove substantially all the active material.

4. A method for preparing a product of the class described which consists in manipulating the following substances in proportions substantially corresponding to the following specific quantities: extracting three thousand pounds of pyrethrum flowers with sufficient ethylene di-chloride to remove substantially all the active material and distilling the extract to obtain an oleo resin.

5. A method for preparing a product of the class described which consists in manipulating the following substances in proportions substantially corresponding to the following specific quantities: extracting three thousand pounds of pyrethrum flowers with sufficient ethylene di-chloride to remove substantially all the active material, distilling the extract to obtain an oleo resin, and then dissolving the oleo resin in a mineral oil within the range of from seventy-five to one hundred fifty gallons.

6. A process which consists in extracting the insecticidal principles of pyrethrum with di-chlor-ethane in a manner to obtain an oleo resin.

7. A method for preparing a concentrated insecticidal solution which consists in extracting pyrethrum flowers with ethylene di-chloride, and distilling the extract to obtain an oleo resin.

8. A method for the purpose described which consists in extracting three thousand pounds of ground pyrethrum flowers with about two thousand gallons of ethylene di-chloride, distilling to remove residual ethylene di-chloride and to obtain an oleo resin of pyrethrum, and then treating the oleo resin with kerosene within the range of seventy-five to one hundred fifty gallons, then filtering and then diluting the solution of the active material with mineral oil in quantities ranging from nineteen to thirty-nine parts.

9. An insecticide containing an ethylene di-chloride extract of pyrethrum.

10. An insecticide containing an ethylene di-chloride extract of pyrethrum, in a mineral oil.

11. A method for the purpose described which consists in extracting pyrethrum flowers with ethylene di-chloride to obtain an oleo resin of pyrethrum.

CHARLES B. GNADINGER.